United States Patent [19]

Sakow

[11] Patent Number: 4,530,629
[45] Date of Patent: Jul. 23, 1985

[54] TOILET BOWL MOUNTING BOLT ASSEMBLY

[76] Inventor: Lawrence Sakow, Rte. 29-Box 271, Zieglersville, Pa. 19492

[21] Appl. No.: 424,061

[22] Filed: Sep. 27, 1982

[51] Int. Cl.³ .............................................. F16B 39/24
[52] U.S. Cl. ..................................... 411/147; 411/531; 411/533; 411/119; 411/424; 4/252 R; 285/56
[58] Field of Search ............... 411/147, 122, 123, 124, 411/116, 119, 120, 121, 107, 427, 432, 531; 285/56, 58, 59, 60; 4/252 R, DIG. 7, 191

[56] References Cited

U.S. PATENT DOCUMENTS

| 753,588 | 3/1904 | Kunkle | 411/123 |
|---|---|---|---|
| 939,001 | 11/1909 | Forster | 285/59 |
| 990,646 | 4/1911 | Fisher | 285/56 |
| 1,684,570 | 9/1928 | Boosey | 285/59 |
| 1,686,216 | 10/1928 | Kyle | 411/531 X |
| 2,472,394 | 6/1949 | Barraket | 411/119 |
| 2,549,357 | 4/1951 | Angelone | 285/56 X |
| 2,704,680 | 3/1955 | Bedford, Jr. | 411/119 X |
| 3,178,749 | 4/1965 | Heepe | 411/119 X |
| 3,339,215 | 9/1967 | Flood | 411/424 X |
| 3,419,298 | 12/1968 | Worley | 411/427 X |
| 3,905,052 | 9/1975 | De Angelis | 285/56 X |
| 4,121,495 | 10/1978 | Malo et al. | 411/369 X |
| 4,384,910 | 5/1983 | Prodyma | 285/56 X |

FOREIGN PATENT DOCUMENTS

| 513980 | 11/1920 | France | 411/123 |
|---|---|---|---|
| 2487456 | 1/1982 | France | 411/427 |
| 529158 | 11/1940 | United Kingdom | 411/432 |
| 658776 | 10/1951 | United Kingdom | 411/427 |

Primary Examiner—Thomas J. Holko
Assistant Examiner—Rodney M. Lindsey
Attorney, Agent, or Firm—Steele, Gould & Fried

[57] ABSTRACT

A mounting bolt assembly to permit one man toilet bowl installation is disclosed. The assembly includes a threaded bolt with integral head to engage within the slot of a usual floor flange. The bolt is undercut in spaced relationship from the head to facilitate shortening after installation simply by bending or snapping about the undercut groove without any need for sawing. A resilient flat washer is associated with the bolt in spaced relationship from the head in a position to permit a portion of the resilient washer to be bent or otherwise urged into the floor flange slot. In this manner, the bolt can be supported in an upright orientation from the floor flange without manual intervention to thereby permit the toilet bowl to be applied over the bolt by a single workman.

3 Claims, 5 Drawing Figures

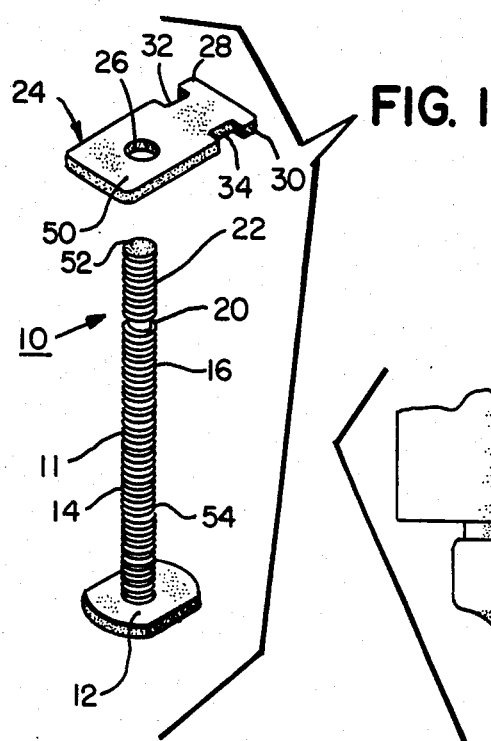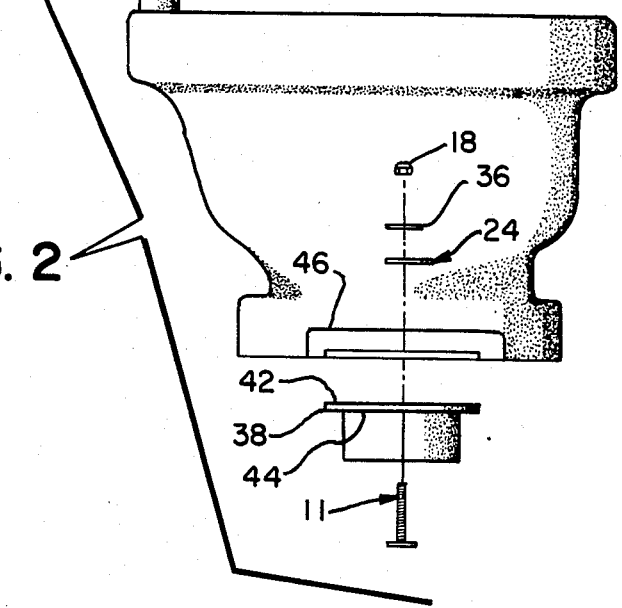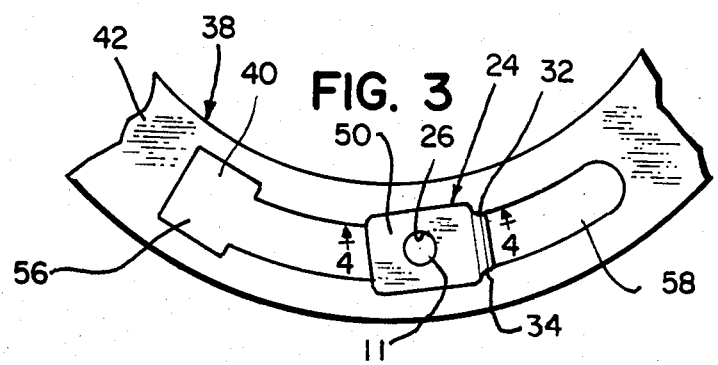

TOILET BOWL MOUNTING BOLT ASSEMBLY

BACKGROUND OF THE INVENTION

The present invention relates generally to mounting systems for toilet bowls, and more particularly, is directed to an improved bolt assembly to simplify toilet bowl mounting procedures.

It is the usual practice when connecting a toilet bowl to the plumbing system to provide a floor flange, at floor level, which flange is securely affixed at the top of the soil pipe bend or fitting to which the toilet is to be connected. A gasket of suitable composition is provided during installation in well known manner to prevent leakage in and about the interconnection between the toilet bowl and the top of the bend.

The floor flanges presently in popular use are provided with arcuate slots within which a pair of closet bolts are secured to provide a means for connecting the toilet bowl to the soil pipe bend in a secure and permanent interconnection. In accordance with the present practice, the closet bolts are arranged in a sliding, loose fit within the floor flange arcuate slots and accordingly, it is usually a two man job to mount a toilet upon the floor flange. One worker or helper must first position and hold the closet bolts in an upright orientation and the other worker can then lift and carefully place the toilet bowl mounting openings over the closet bolts. Inasmuch as the toilet bowls of various manufacturers are usually mounted in the same manner, the closet bolts usually available for such purposes are fabricated long enough to accommodate the widest or thickest bowl mounting flanges of the more popular toilet brands. Accordingly, in those instances wherein the bowl mounting flange is substantially less in height than the length of the closet bolt, it is now the common practice to cut the bolts to size by employing a hacksaw after the parts are positioned and assembled. In many instances, this creates a considerable problem inasmuch as the worker usually must apply the hacksaw to the closet bolt in an awkward or confined attitude, thereby making the bolt cutting a somewhat difficult and time consuming job.

The need remains therefore to provide a mounting bolt assembly which will permit a single worker to install a toilet bowl in a quickly executed and efficient manner to thereby save time and consequently costs when installing a toilet bowl.

SUMMARY OF THE INVENTION

The present invention relates generally to the field of closet bolt assemblies, and more particularly, is directed to a closet bolt assembly including a resilient washer for holding the bolt in place during assembly and including means for quickly and easily changing the length of the bolt whenever job conditions so require.

The present invention comprises generally a threaded closet bolt of conventional length which is provided near its free end with an undercut peripheral groove to define a removable section at the end of the bolt. The undercut groove may be positioned at any desired predetermined distance from the end of the bolt, for example one half inch, to provide a ready means for shortening the bolt by the said predetermined distance whenever so desired simply by snapping or twisting the free end. After the closet bowl flange has been positioned over the floor flange and the closet bolts, the removable section can be easily separated by simply snapping or twisting the removable section relative to the remainder of the bolt, thereby completely eliminating the need to employ a hacksaw. A conventional pair of pliers or perhaps a suitable wire cutting pliers could be employed for this purpose.

Additionally, the bolt assembly comprises a resilient, flat washer of width greater than the width of the arcuate slot provided in a conventional toilet bowl mounting floor flange. The resilient washer comprises a generally rectangular body which overfits the arcuate floor flange groove or slot and includes a hole therethrough for receiving and mounting the closet bolt. At one end of the resilient washer is provided a pair of taps of suitable configuration to permit the tabs to be tucked into the flange opening to hold the closet bolt in an upright position and to prevent the bolt from turning during assembly. In this manner, the former need to require two men to install a toilet bowl can now be reduced to a one man job, inasmuch as there is longer any need to provide a worker simply to hold the closet bowl in an upright position while a second worker lifts the closet bowl into position over the floor flange while positioning the closet bolts through the bowl mounting openings.

It is therefore an object of the present invention to provide an improved closet bolt assembly of the type set forth.

It is another object of the present invention to provide a novel closet bolt assembly comprising means to easily shorten the length of the bolt upon assembly without the need to employ a hacksaw.

It is another object of the present invention to provide a novel closet bolt assembly comprising a closet bolt including a threaded shank having a head at one end thereof, a resilient washer positioned on the shank, the washer including means to easily engage the resilient washer with the floor flange to maintain the threaded shank in upright position without manual employment, whereby the closet bolt can be secured to the floor flange in a upright position to receive the closet bowl mounting flange thereover.

It is another object of the present invention to provide a novel closet bolt assembly comprising a closet bolt including a threaded shank and a head at one end thereof, an undercut snap groove provided in the shank in spaced relationship from the head and a flat, resilient washer having an opening to receive the threaded shank therethrough, the flat, resilient washer being of size to overfit the usual arcuate slot of a closet floor flange, the resilient washer further including tab means engageable within the floor flange slot to hold the closet bolt upright for closet bowl mounting purposes.

It is another object of the present invention to provide a novel closet bolt assembly that is inexpensive in manufacture, simple in design and trouble free when in use.

Other objects and a fuller understanding will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is an enlarged, exploded, perspective view of the closet bolt assembly.

FIG. 2 is an exploded, elevational view showing the closet bolt assembly of the present invention in use to mount a closet bowl to a floor flange.

FIG. 3 is an enlarged partial plan view showing the bolt assembly positioned within the arcuate slot of a floor flange.

DESCRIPTION OF THE PREFERRED EMBODIMENT OF THE INVENTION

Figure 4:
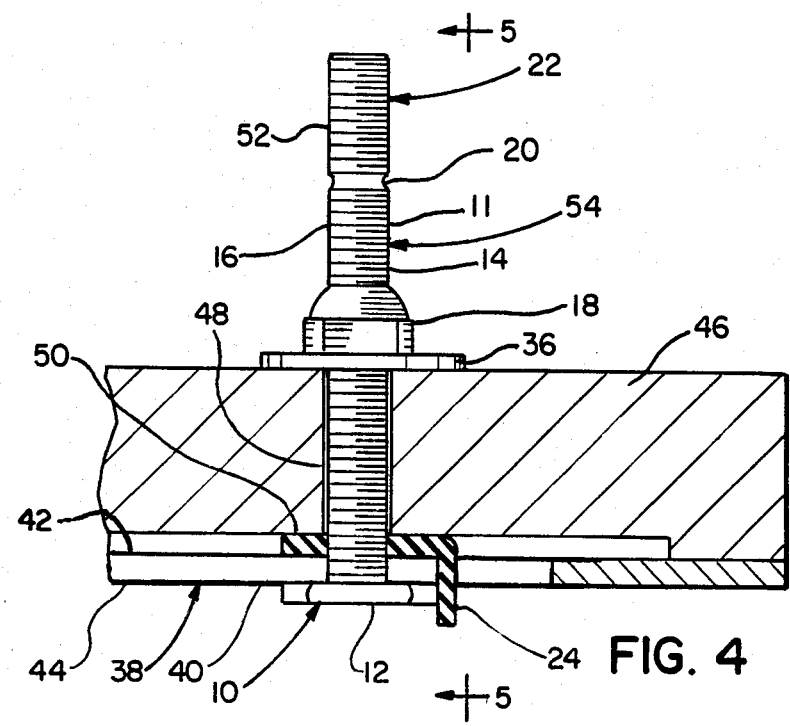
FIG. 4 is an enlarged cross-sectional view, taken along line 4—4 on FIG. 3, looking in the direction of the arrows.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIGS. 1 and 2 a bolt assembly 10 which comprises generally a threaded bolt 11, a flat resilient washer 24, a round, metallic washer 36 and a securing nut 18. As shown, the bolt 11 comprises an integral head 12 and shank 14, which shank is conventionally provided with a continuous thread 16.

As best seen in FIG. 1, the threaded shank 14 of the bolt 11 is undercut near its free end 52 to provide a peripheral groove 20 and to define a removable section 22 from the remainder of the bolt. The groove 20 is machined, pressed or otherwise provided of sufficient depth to permit the removable section 22 to be readily snapped from the permanent section 54 of the bolt 11 by simply bending or twisting the removable section above the groove 20.

Still referring to FIG. 1, it will be seen that the resilient washer 24 includes a flat body 50 of generally rectangular configuration. The body 50 is preferably fabricated of rubber and is provided with an opening 26 of size to receive tightly therein the threaded shank 14. Preferably, the diameter of the opening 26 is less than the diameter of the bolt shank 14 whereby the opening 26 must be stretched when the shank 14 is inserted through the opening. In this manner, after the resilient washer 24 is properly positioned relative to the bolt head 12, the natural resiliency of the washer material will cause the washer to frictionally engage the bolt 11 and thereby function to discourage the bolt from turning in the manner hereinafter more fully set forth.

The flat, resilient washer 24 further includes a pair of bendable tabs 28, 30 at one end thereof for bolt upright holding purposes as hereinafter more fully set forth. As illustrated, the tabs 28, 30 are defined from the washer body 50 by respective similar grooves 32, 34. The resilient washer is designed for positioning upon the top of the floor flange in spaced relation from the bolt head, which head is secured below the floor flange.

In use, the bolt assembly 10 is attached to the floor flange 38 which is conventionally secured to the top of the closet bend (not shown) in the usual manner for toilet bowl mounting purposes. The floor flange 38 includes an arcuate opening or openings 40, which openings are usually plural in number and are diametrically opposed. In the usual manner, the bolt head 12 is applied through the widened area 56 of the arcuate slot 40 and then is moved into the narrow area 58 wherein it will be readily secured against the bottom 44 of the floor flange 38 because the dimensions of the head 12 will be greater than the width of the narrow area 58 in a well known manner. With the bolt head 12 secured within the arcuate slot narrow area 58, the resilient washer 24 can then be applied over the bolt by urging the washer downwardly so that the threaded bolt shank 14 is pushed through the washer opening or hole 26. The washer 24 is then downwardly urged along the threaded shank 14 until the bottom of the washer touches the top 42 of the toilet floor flange 38. It is noteworthy that the width of the washer 24 is greater than the width of the slot narrow area 58 so that a portion of the washer bears against the top 42 of the floor flange 38 for bolt holding purposes.

With the bolt held in upright position by action of the washer 24 against the top of the floor flange 38, the tabs 28, 30 can then be forced into the opening 58 simply by bending the tabs downwardly out of the plane of the flat body 50 to engage the sidewalls of the slot or flange opening 40. In this manner, the engagement of the tabs 28, 30 with the arcuate opening 40 in the floor flange 38 and the frictional engagement of the washer hole 26 with the base of the threaded shank 14 serve both to hold the closet bolt in an upright position and to prevent turning of the bolt during the remaining assembly procedures.

Figure 5:
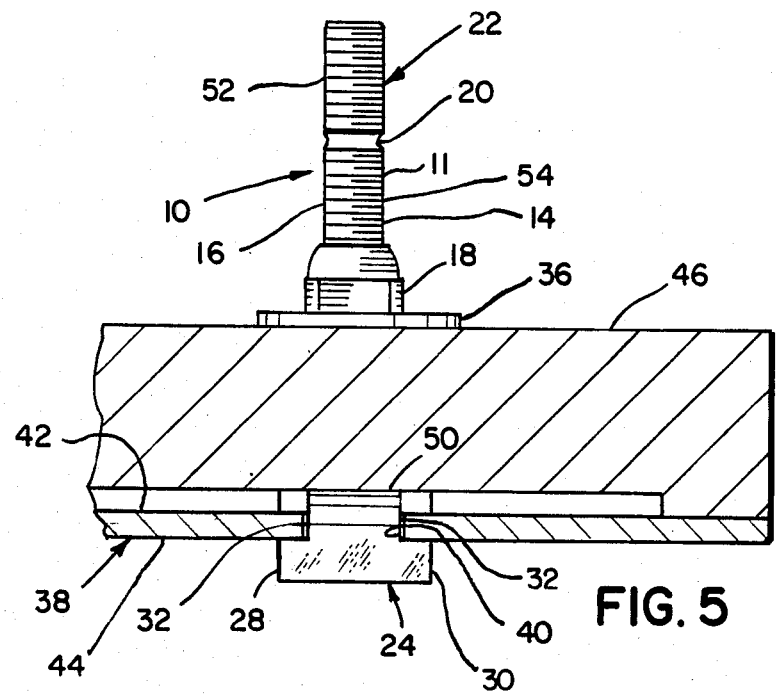
FIG. 5 is an cross-sectional view, taken along line 5—5, on FIG. 4 looking in the direction of the arrows.

In use, the closet bolt assembly 10 is secured to a toilet floor flange 38 in the manner hereinbefore described and as illustrated in FIGS. 3, 4 and 5. Preferably two such bolt assemblies are provided with each toilet bowl installation. When the bolts are properly positioned and held in upright position as illustrated, then the toilet bowl mounting flange 46 can be applied over the bolt assemblies 10 by positioning the respective, diametrically opposed holes 48 over the threaded bolt shanks 14. A conventional toilet mounting gasket is also employed but is not illustrated inasmuch as this gasket forms no part of the present invention.

After the toilet bowl has been applied over the floor flange 38 with the threaded shanks 14 projecting upwardly of the bowl mounting flange 46 through the mounting flange holes 48, the proper length of the shanks 14 can then be determined for the particular bowl being installed. If the length is satisfactory as installed, then a metallic washer 36 and the nut 18 can be applied to the shank over the top of the toilet mounting flange 46 in conventional manner. If, on the other hand, it appears that the threaded shanks 14 are too long, then the removable sections 22 of the bolts 11 can be grasped and bent or twisted as necessary to sever the removable sections 22 from the remaining sections 54 of the bolts in a relatively easy operation without requiring the use of a hacksaw. Once the removable sections 22 are removed, then the metallic washer 36 and the nut 18 can be applied in the usual manner to secure the bowl flange 46 to the floor flange 38 conventionally.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A closet bolt assembly comprising
   a bolt comprising a threaded shank and a head, the shank terminating at one end at the head and at the other end in a free terminus, the shank being of uniform diameter and being threaded throughout its length;

a resilient washer applied over the threaded shank, the washer comprising a flat body including a hole therein, the hole being smaller in diameter than the outer thread diameter of the shank, the shank being inserted through the hole and the washer being frictionally engaged with the threaded shank:

the washer further comprising bendable means integral with the body to prevent rotation of the washer and the frictionally engaged shank;

a closet mounting floor flange having an arcuate opening defined between parallel sidewalls therein, a top surface and a bottom surface, the bolt head being positioned within the arcuate opening with the bolt head in contact with the flange bottom surface, with the threaded shank above the flange top surface and the resilient washer being in contact with the flange top surface, and the bendable means of the washer being bent downwardly and being positioned within the flange arcuate opening and wherein the width of the washer body and the width of the bendable means is greater than the width of the arcuate opening, whereby the bendable means of the washer can be secured upon the floor flange by bending to support the bolt in an upright position.

2. The bolt assembly of claim 1 wherein the shank comprises a removable section and an integral permanent section and wherein the shank is provided with an undercut circular groove, the groove being positioned in the shank to define the removable section from the permanent section.

3. The bolt assembly of claim 1 wherein the bendable means comprises a pair of endwardly positioned tabs, each tab being defined from the remainder of the washer by a groove and wherein the combined width of the tabs is equal to the width of the body.

* * * * *